(12) United States Patent
Seinfeld et al.

(10) Patent No.: US 7,603,712 B2
(45) Date of Patent: Oct. 13, 2009

(54) PROTECTING A COMPUTER THAT PROVIDES A WEB SERVICE FROM MALWARE

(75) Inventors: Marc E Seinfeld, Mid Levels (HK); Adrian M Marinescu, Sammamish, WA (US); Charles W Kaufman, Sammamish, WA (US); Jeffrey M Cooperstein, Bellevue, WA (US); Michael Kramer, Yonkers, NY (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 11/112,507

(22) Filed: Apr. 21, 2005

(65) Prior Publication Data
US 2006/0242709 A1 Oct. 26, 2006

(51) Int. Cl.
G08B 23/00 (2006.01)
G06F 12/16 (2006.01)

(52) U.S. Cl. .......................................... 726/24; 726/22
(58) Field of Classification Search .................... 726/24
See application file for complete search history.

(56) References Cited

U.S. PATENT DOCUMENTS

| | | | |
|---|---|---|---|
| 5,414,833 A | 5/1995 | Hershey et al. | |
| 5,867,651 A * | 2/1999 | Dan et al. | 709/203 |
| 5,951,698 A * | 9/1999 | Chen et al. | 714/38 |
| 5,960,170 A * | 9/1999 | Chen et al. | 714/38 |
| 6,529,949 B1 * | 3/2003 | Getsin et al. | 709/217 |
| 6,728,886 B1 * | 4/2004 | Ji et al. | 726/24 |
| 6,785,732 B1 * | 8/2004 | Bates et al. | 709/232 |
| 6,851,057 B1 * | 2/2005 | Nachenberg | 726/24 |
| 6,907,430 B2 * | 6/2005 | Chong et al. | 707/100 |
| 7,093,239 B1 * | 8/2006 | van der Made | 717/135 |
| 7,107,617 B2 * | 9/2006 | Hursey et al. | 726/22 |
| 7,231,637 B1 * | 6/2007 | McEwan | 717/171 |
| 7,284,274 B1 * | 10/2007 | Walls et al. | 726/25 |
| 2003/0177397 A1 * | 9/2003 | Samman | 713/201 |
| 2003/0204632 A1 * | 10/2003 | Willebeek-LeMair et al. | 709/249 |
| 2005/0234856 A1 * | 10/2005 | Baumhof | 707/1 |
| 2005/0273860 A1 * | 12/2005 | Chess et al. | 726/25 |
| 2006/0015940 A1 * | 1/2006 | Zamir et al. | 726/22 |

OTHER PUBLICATIONS

Sung et al., Static Analyzer of Vicious Executables (SAVE), 2004, IEEE, ACSAC '04.*
Carrera et al., Digital Genome Mapping-Advanced Binary Malware Analysis, Virus Bulletin Conference, Sep. 2004, pp. 187-197.*

(Continued)

*Primary Examiner*—Kambiz Zand
*Assistant Examiner*—William S Powers
(74) *Attorney, Agent, or Firm*—Workman Nydegger

(57) ABSTRACT

In accordance with the present invention, a system, method, and computer-readable medium for identifying malware in a request to a Web service is provided. One aspect of the present invention is a computer-implemented method for protecting a computer that provides a Web service from malware made in a Web request. When a request is received, an on-demand compilation system compiles high-level code associated with the request into binary code that may be executed. However, before the code is executed, antivirus software designed to identify malware scans the binary code for malware. If malware is identified, the antivirus software prevents the binary code associated with the request from being executed.

20 Claims, 5 Drawing Sheets

OTHER PUBLICATIONS

Over et al., IBM Secure Way Host On-Demand 4.0: Enterprise Communications in the Era of Network Computing, IBM Technical Support Organization, Mar. 2000, pp. 1-492.*

International Search Report dated Dec. 13, 2007 for PCT Application Serial No. PCT/US 06/14743, 2 pages.

* cited by examiner

PROTECTING A COMPUTER THAT PROVIDES A WEB SERVICE FROM MALWARE

FIELD OF THE INVENTION

The present invention relates to computers and, more particularly, to protecting a computer that provides a Web service from malware.

BACKGROUND OF THE INVENTION

Connectivity to computer networks, and more particularly to the Internet, revolutionized the manner in which goods and services are provided. Prior to the near-universal connectivity to networks and the Internet, human interaction was typically required to complete transactions, such as purchasing software or providing data in an informational database. Moreover, distribution of some products required a system for packaging and distributing the products to buyers. However, creating a system of distributing software and similar products was typically expensive for providers. Moreover, exchanging large quantities of information through non-computerized means required at least some human involvement and, as a result, was time-consuming and expensive.

While the interconnectivity provided by modern computer networks is generally conducive to allowing computers exchange information, interconnectivity has also made computers more vulnerable to attacks. As those skilled in the art will recognize, these attacks come in many different forms including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

When a computer is attacked or "infected" by computer malware, the adverse results are varied, including disabling system devices; erasing or corrupting firmware, applications, or data files; transmitting potentially sensitive data to another location on the network; shutting down the computer; or causing the computer to crash. Yet another pernicious aspect of many, though not all, computer malware is that an infected computer is used to infect other computers.

One system that facilitates the communication of data between network computers, using protocols developed for the Internet, is a Web service. Those skilled in the art and others will recognize that a Web service refers to a software system with a network accessible interface that performs actions on behalf of other software systems. A Web service is typically accessed using standard protocols such as the Simple Object Access Protocol ("SOAP"). A software system located on a remote computer may interact with a Web service in a manner prescribed by definitions that are provided in a service description which defines the methods for communicating with the Web service. Also, interactions between software systems typically occur using Extensible Markup Language ("XML") based messages exchanged via Internet-based protocols, such as the HyperText Transfer Protocol ("HTTP"). For example, one way to communicate with a Web service is using the Web Services Description Language ("WSDL") which is in XML-based language that is used to describe a Web service as a set of endpoints. In this way, a Web service may expose processes to remote software systems for accessing data or executing operations on a computer, or a cluster of computers, that provides the Web service. Typically, a Web service supports interactions with other software systems at a specified location on a network that may be identified using a Uniform Resource Indicator ("URI"). A Web service allows developers to use different operating systems and programming languages for communicating between software systems. Moreover, processes provided by a Web service are accessible, for example, by exchanging XML data through a Web interface. As a result, different programs may be combined in a loosely coupled manner to achieve complex operations.

Unfortunately, an entity that makes requests to a Web service (hereinafter referred to as a "service requester" or a "requestor computer") may be able to generate one or more messages that have malicious effects. Stated differently, computers that provide a Web service are susceptible to malware generated by services requestors. For example, a malware author may pass a validly formed request to a Web service that causes a denial of service attack, due to the computational complexity of parsing the XML grammar in the request on a server computer. As mentioned previously, this type of misuse/abuse of legitimate computer system features—that causes a negative effect on the computer receiving the transmission is categorized as malware in the present application. Those skilled in the art and others will recognize that computers and networks need certain resources to operate, such as network bandwidth, memory, disk space, and access to a central processing unit ("CPU"), etc. In a denial of service attack, a request is made to a Web service that is designed to consume and overwhelm scarce resources on the computer that provides the Web service. As a result, other service requestors are denied, or have limited access to, the Web service that is being attacked. Those skilled in the art and others will recognize that a denial of service attack is just one example of a way in which computers that provide a Web service may be attacked by malware generated in a request to the Web service.

SUMMARY OF THE INVENTION

The foregoing problems with the state of the prior art are overcome by the principles of the present invention, which is directed toward a system, method, and computer-readable medium for protecting a computer that provides a Web service from malware.

One aspect of the present invention is a method for protecting a computer in a networking environment that provides a Web service from malware generated by a requestor computer. More specifically, the method comprises receiving a request at the computer that provides the Web service, causing high-level code associated with the request to be compiled into binary code that may be executed, and scanning the binary code for malware. If the method identifies malware in the request, then code associated with the request is not executed. Conversely, if malware is not identified, then the request is satisfied.

Another aspect of the present invention is a software system that prevents malware from being executed on a computer that provides a Web service. In one embodiment of the present invention, the software system includes a network accessible interface capable of accepting a request. When the request is received, an on-demand compilation system may compile high-level code associated with the request into binary code that is capable of being executed. However, before binary code associated with the request is executed, antivirus software scans the binary code for malware. In one embodiment, the antivirus software includes a scan engine that compares the binary code to malware signatures generated from known malware.

In still another embodiment, a computer-readable medium is provided with contents, i.e., a program that causes a computer to operate in accordance with the method described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In accordance with the present invention, a system, method, and computer-readable medium for identifying malware in a request to a Web service are provided. One aspect of the present invention is a computer-implemented method that protects a computer that provides a Web service from malware implemented in a Web request. When a request is received, an on-demand compilation system compiles high-level code associated with the request into binary code that may be executed. However, before the code is executed, antivirus software designed to identify malware associated with a request scans the binary code for malware. If malware is identified, the antivirus software prevents the binary code from being executed.

Although the present invention primarily will be described in the context of identifying malware transmitted to a Web service, those skilled in the relevant art and others will appreciate that the present invention is also applicable to other software systems than those described. The following description first provides an overview of aspects of the prior art and software systems in which the present invention may be implemented. Then a method that implements the present invention is described. The illustrative examples provided herein are not intended to be exhaustive or to limit the invention to the precise forms disclosed. Similarly, any steps described herein may be interchangeable with other steps or combinations of steps in order to achieve the same result.

Figure 1:
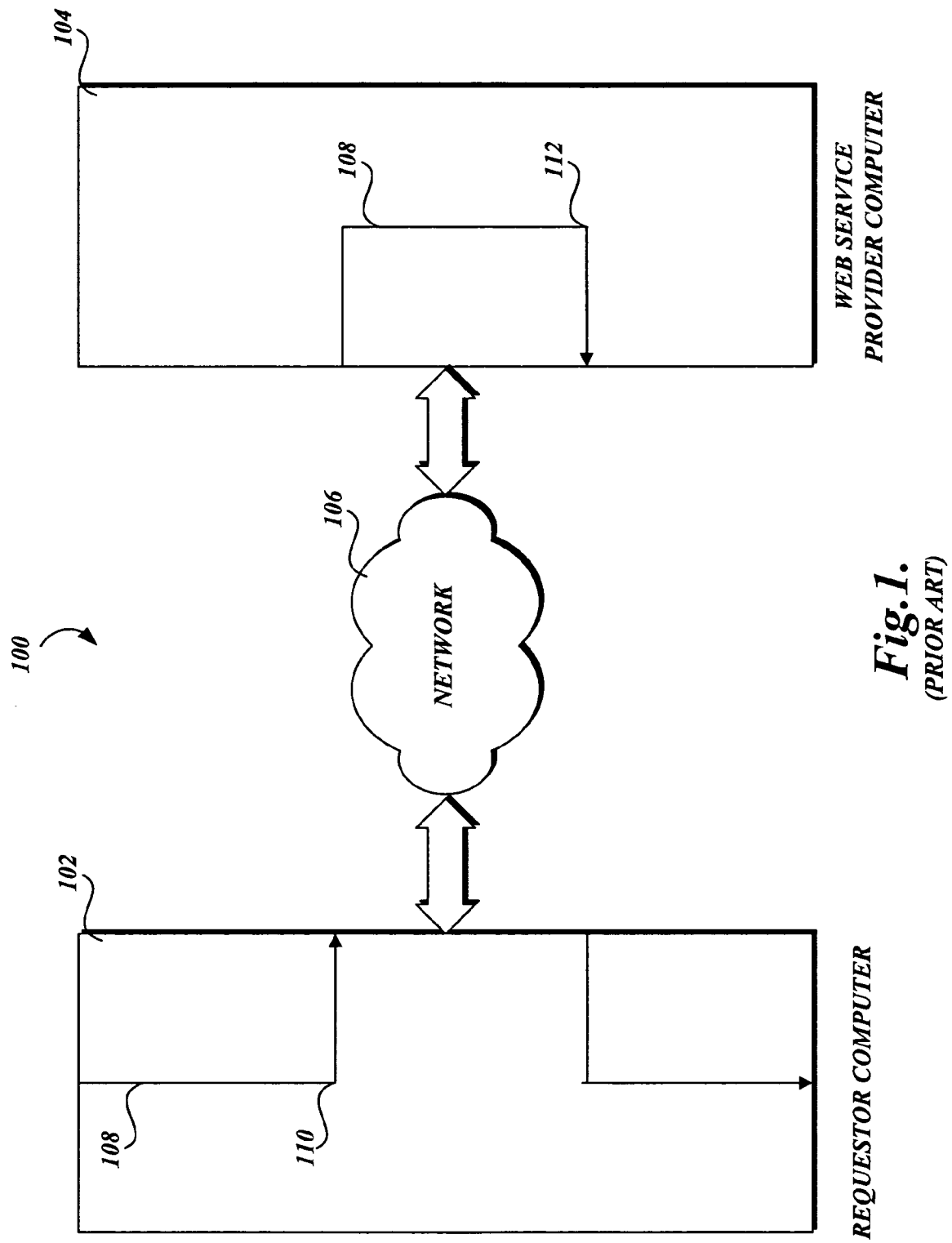
FIG. 1 is a pictorial depiction of a networking environment that includes a requestor computer and Web service provider computer suitable to illustrate aspects of the prior art.

FIG. 1 and the following discussion is intended to provide a brief, general description of a Web service implemented in a networking environment 100 that is formed in accordance with the prior art. As illustrated in FIG. 1, the networking environment 100 is comprised of a requestor computer 102 and a Web service provider computer 104. Also, the requestor computer 102 and the Web service provider computer 104 are communicatively connected via the network 106. Those skilled in the art and others will recognize that the network 106 may be implemented as a local area network ("LAN"), wide area network ("WAN"), cellular network, IEEE 802.11, Bluetooth wireless networks, and the like. However, typically, the network 106 will be the global network commonly known as the Internet or World Wide Web.

It should be noted that, while the present invention is generally described in terms of operating in conjunction with personal computers—such as computers 102 and 104—it is for illustration purposes only and should not be construed as limiting upon the present invention. Those skilled in the art will readily recognize that almost any type of computer may implement or interact with a Web service. Accordingly, the present invention may be advantageously implemented to protect numerous types of computers, computing devices, or computing systems including, but not limited to, personal computers, tablet computers, notebook computers, mini- and mainframe computers, server computers, and the like.

As further illustrated in FIG. 1, the requestor computer 102 maintains an exemplary flow 108 of program execution. Prior to the infrastructure of modern networks, programs were executed entirely on a single computer. However, as illustrated in FIG. 1, the Web service provider computer 104 provides a network 106 accessible Web service. Those skilled in the art and others will recognize that the Web service provides "black-box functionality" that may be accessed from a remote computer using standard network protocols. For example, an application executing on one computer, such as the requestor computer 102, may invoke a function on a computer that provides the Web service at event 110, by issuing a request. As a result, the flow 108 of program execution is transferred from the requestor computer 102 to the Web service provider computer 104. In this instance, invoking the function will typically cause program code to be executed on the Web service provider computer 104. Those skilled in the art and others will recognize that a request may be constructed in a way that causes malware to be executed on the Web service provider computer 104. When the function invoked on the Web service completes, at event 112, the flow 108 of program execution is transferred back to the requestor computer 102. Typically, the Web service will cause data in the form of the response to be transmitted to the requestor computer 102 using standard network protocols. As illustrated in FIG. 1, the Web service 110 is a type of virtual application that uses network 106 two-link software components.

Figure 2:
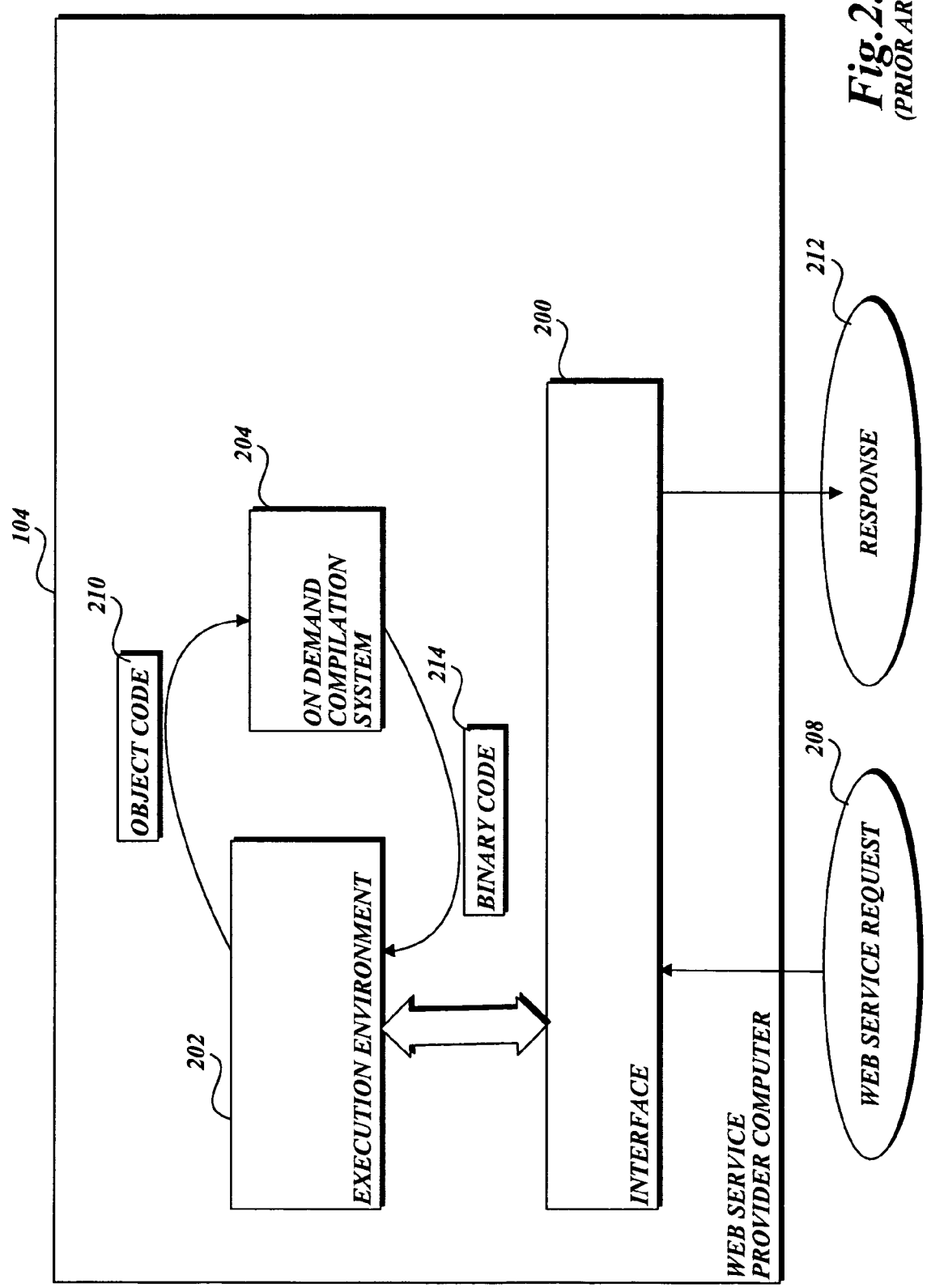
FIG. 2 is a block diagram that illustrates components of a Web service provider computer capable of satisfying Web service requests, in accordance with the prior art.

Now with reference to FIG. 2, components of the Web service provider computer 104 illustrated in FIG. 1 that have been implemented in the prior art will be briefly described. As illustrated in FIG. 2, the Web service provider computer 104 includes an interface 200, an execution environment 202, and an on-demand compilation system 204. When a request, such as the Web service request 208, is received from a remote computer, the interface 200 performs actions that include, but are not limited to, parsing the request and passing data associated with the request to the execution environment 202. Typically, the Web service request 208 is an XML-based message exchanged via Internet-based protocols, such as HTTP.

Generally described, the execution environment 202 provides the logic and services for managing the execution of program code when the request 208 is received by the Web service. Those skilled in the art and others will recognize that program code that provides and interacts with a Web service may be written in one of a number of different high-level programming languages. In some systems in the prior art, the execution environment 202 translates program code into an intermediate programming language from which object code 210 is generated in the execution environment 202.

Typically, the unit in which requests are satisfied by a Web service is a page. For example, the request 208 may cause an algorithm to be executed by the Web service with the results of the algorithm being transmitted back to the requestor computer 102 in the form of a Web page. Those skilled in the art others will recognize that to generate a response 212 in the form of a page, the on-demand compilation system 204 compiles object code 210 into binary code 214 at various times and in different contexts. Moreover, compilation of object code 210 typically occurs when the code is first required and then cached for future use. In some systems in the prior art, the on-demand compilation system 204 compiles object code 210 into a Dynamically Linked Library ("DLL") that is cached in memory in order to satisfy subsequent requests. As a result, the number of compilations performed by the on-demand compilation system 204 is minimized, as a binary DLL will only be compiled "on demand."

It should be well understood that description of the Web service provider computer 104 provided with reference to FIG. 2 is highly simplified. Moreover, the component architecture illustrated in FIG. 2 of the Web service provider computer 104 should be construed as exemplary and not limiting. In practice, the Web service provider computer 104, the interface 200, the execution environment 202, and the on-demand compilation system 204 will have additional components and functions not illustrated in FIG. 2 or described in the accompanying text.

Figure 3:
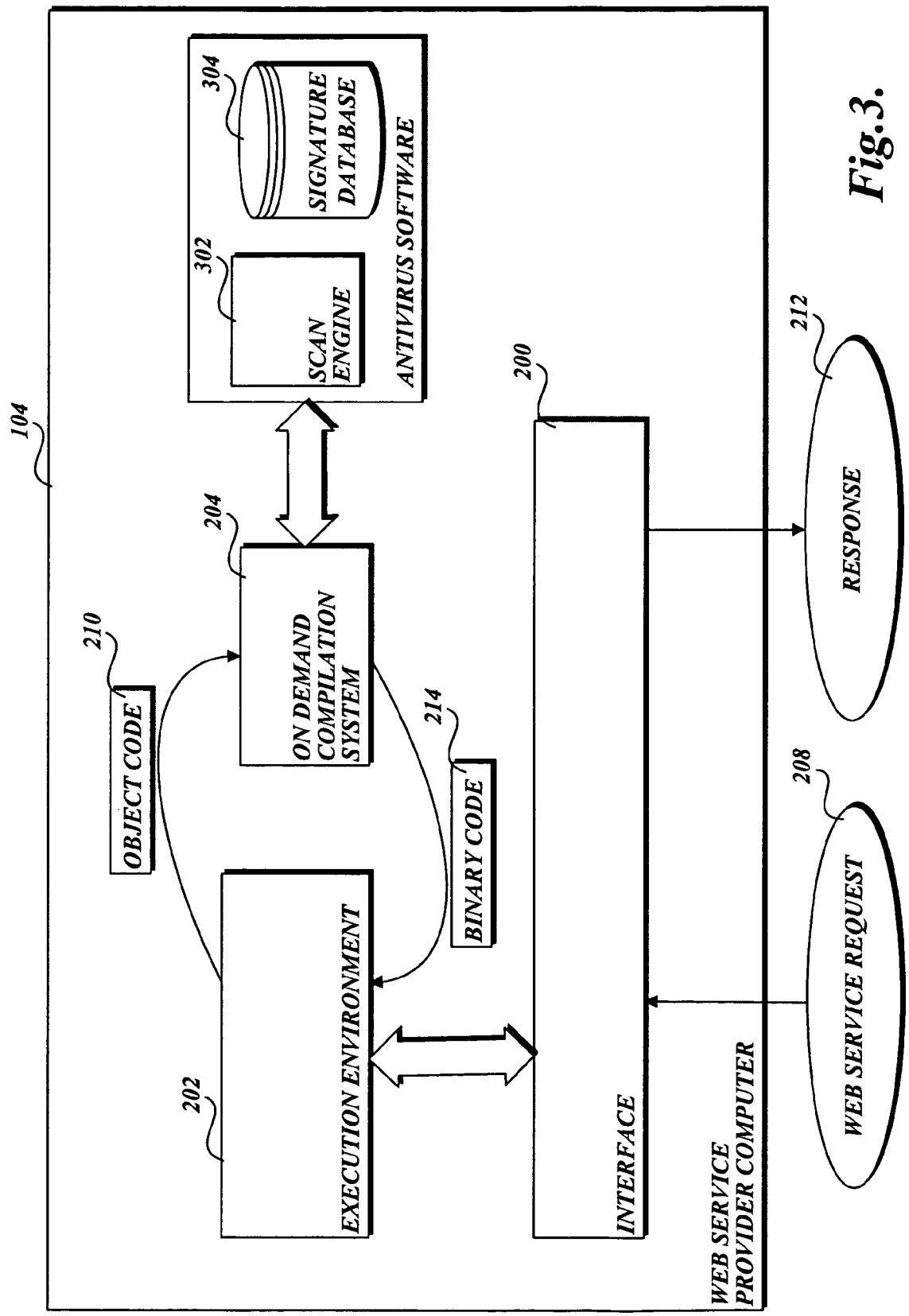
FIG. 3 is a block diagram that illustrates components of a Web service provider computer capable of satisfying Web service requests without being infected with malware, in accordance with one embodiment of the present invention.

Now with reference to FIG. 3, components of the Web service provider computer 104 that are capable of implementing aspects of the present invention will be described. As illustrated in FIG. 3, the Web service provider computer 104 includes the interface 200, the execution environment 202, and the on-demand compilation system 204 illustrated in FIG. 2. Moreover, similar to the description provided with reference to FIG. 2, the Web service request 208 is received at the Web service provider computer 104 from a remote computer. As a result, the object code 210 is generated by the execution environment 202. However, in this instance, aspects of the present invention cause the on-demand compilation system 204 to notify the antivirus software 300 when the binary code 214 is scheduled to be executed. Components of the antivirus software 300, which include a scan engine 302 and a signature database 304, then determine whether the binary code 214 generated by the on-demand compilation system 204 contains malware.

In accordance with aspects of the present invention, the on-demand compilation system 204 is configured to notify the antivirus software 300 when the binary code 214 is scheduled to be executed. In response, the antivirus software 300 performs an analysis on the binary code 214 to determine if the code 214 implements the functionality of malware. In one embodiment of the present invention, the antivirus software 300 implements a signature-based system for detecting malware. One known technique for identifying malware in this type of system includes obtaining a copy of the malware "in the wild." Then program code that implements the malware is processed with a function that converts the program code into a "signature" that may be used to uniquely identify the malware. The scan engine 302 illustrated in FIG. 3 may employ this known technique to scan the binary code 214 for a malware signature. For example, malware signatures stored in the signature database 304 may be compared to the binary code 214. However, the scan engine 302 may be configured to perform additional types of analysis in order to determine if the binary code 214 is infected with malware. Thus, it should be well understood that other types of malware detection systems not described herein may be implemented in the antivirus software 300.

Figure 4:
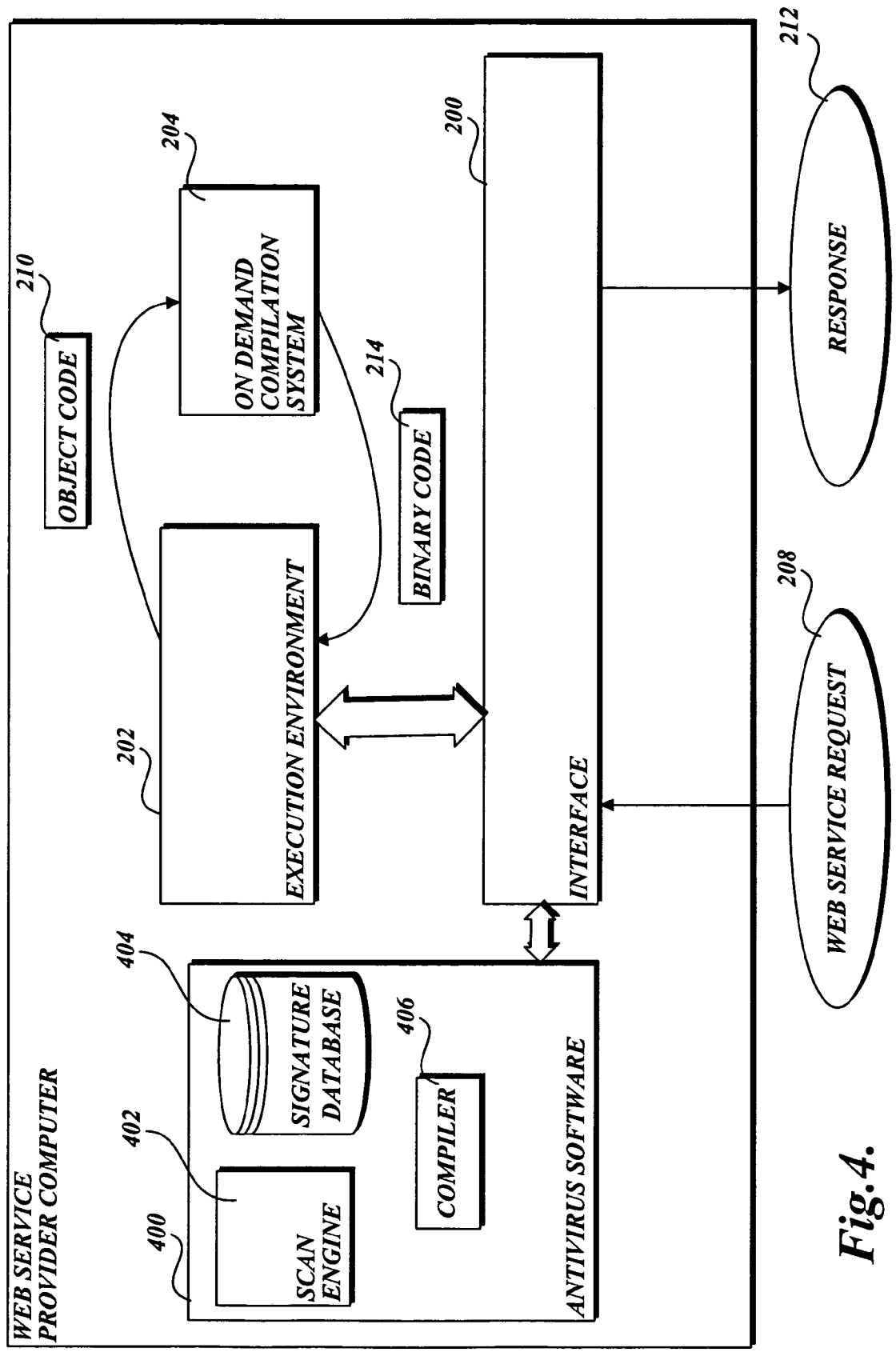
FIG. 4 is a block diagram that illustrates components of a Web service provider computer capable of satisfying Web service requests without being infected with malware, in accordance with another embodiment of the present invention.

Now with reference to FIG. 4, an alternative embodiment of the present invention will be described in which requests to a Web service are scanned for malware before being processed by the Web service. As illustrated in FIG. 4, the Web service provider computer 104 contains many of the same components as illustrated in FIG. 3. However, in this embodiment of the present invention, when the Web service request 208 is received at the interface 200, the request 208 and data associated with the request 208 are passed to the antivirus software 400. As illustrated in FIG. 4, the antivirus software 400 includes a scan engine 402, a signature database 404, and a compiler 406. Those skilled in the art and others will recognize that the scan engine 402 and the signature database 404 will typically have similar functions as the similarly-named components described above with reference to FIG. 3. However, the scan engine 402 illustrated in FIG. 4 may perform additional functions than the scan engine 302 described above with reference to FIG. 3. For example, the scan engine 402 may scan an XML structure in a request for patterns that match signatures of valid but malicious XML constructs. Stated differently, the scan engine 402 may search XML source data received from remote computers for a pattern or signature that matches known malware. For instance, those skilled in the art and others will recognize that XML requests may contain an embedded Document Type Definition ("DTD") structure. However, DTD structures may be formed in a way that causes an XML parser, on the Web service provider computer 104, to use excessive computer resources in order process the DTD structure. In one embodiment of the present invention that protects a computer which uses an XML parser, raw input into the Web service is scanned for XML syntax that matches recognizable patterns associated with malware. As a result, XML input such as nested DTD structures that are designed to overwhelm an XML parser may be identified as malware before being processed by the Web service. In order to prevent the occurrence of "false positives" or instance when malware is incorrectly identified, configuration parameters may be established that allow XML constructs which are normally identified as "malware" to be processed by the Web service. Thus, an administrative entity such as a system administrator may configure the antivirus software 400 to meet the needs of an organization.

In the embodiment of the present invention illustrated in FIG. 4, when the Web service request 208 is received, it is passed to the antivirus software 400. After the XML source data is analyzed by the scan engine 402, the compiler 406 400 generates the binary code that will be executed as a result of the request. Then the scan engine 402 obtains malware signatures from the signature database 404 and compares the signatures to the binary code generated by the compiler 406. Those skilled in the art and others will recognize that the embodiment of the present invention illustrated in FIG. 4 may cause the same high-level code to be compiled twice. For example, the compiler 406 may generate binary code for purposes of malware detection. Similarly, the on-demand compilation system 204 may cause the same binary code to be generated if the antivirus software 400 does not detect malware. An optimization, in this embodiment, caches or stores the binary code generated by the compiler 406 in an area of memory available to demand compilation system 204.

The technique employed to intercept requests transmitted to the Web service provider computer 104, may be implemented as an Internet Server Application Program Interface ("ISAPI") filter. Those skilled in the art and others will recognize that an ISAPI filter allows software modules to register for events and edit a data stream that is being transmitted to a Web service. With regard to the present invention, requests made to a Web service may be intercepted at an ISAPI filter that performs pre-processing of the requests for purposes of malware detection. In one embodiment of the present invention, the preprocessing involves generating binary code that will be executed, as a result of a request, and determining whether this binary code implements the functionality of malware.

As mentioned previously, the present invention scans binary code for malware before the binary code is executed. By scanning code in binary form as opposed to code in a high-level language, such as source code, the present invention may use traditional techniques, such as signature-based techniques of binary code to detect malware. However, in alternative embodiments of the present invention, a scan for malware may be performed while code associated with a request is in a high-level language. For example, as described above requests made to a Web service typically use the XML messaging protocol. In this instance, antivirus software provided by the present invention may scan a request for specific XML-based syntax that is characteristic of malware. Moreover, in some execution environments, code associated with a request is translated into an intermediate language before being compiled into binary code. In this instance, a scan for malware may be performed on the code after being translated into the intermediate language.

Now with reference to FIG. 5, an exemplary embodiment of a scan method 500 that identifies malware in a request to a Web service will be described. In an exemplary embodiment of the present invention, the scan method 500 is implemented in an existing system designed to receive a Web request and execute code to satisfy the request. In summary, the scan method 500 identifies instances in which a scan for malware needs to be performed to prevent potentially exposing a computer that provides a Web service to malware. When the computer has the potential to be exposed to malware, the method 500 causes a scan to be performed before any code associated with the request is executed. With continuing reference to FIGS. 1-4 and the accompanying descriptions, an exemplary scan method 500 will now be described.

Figure 5:
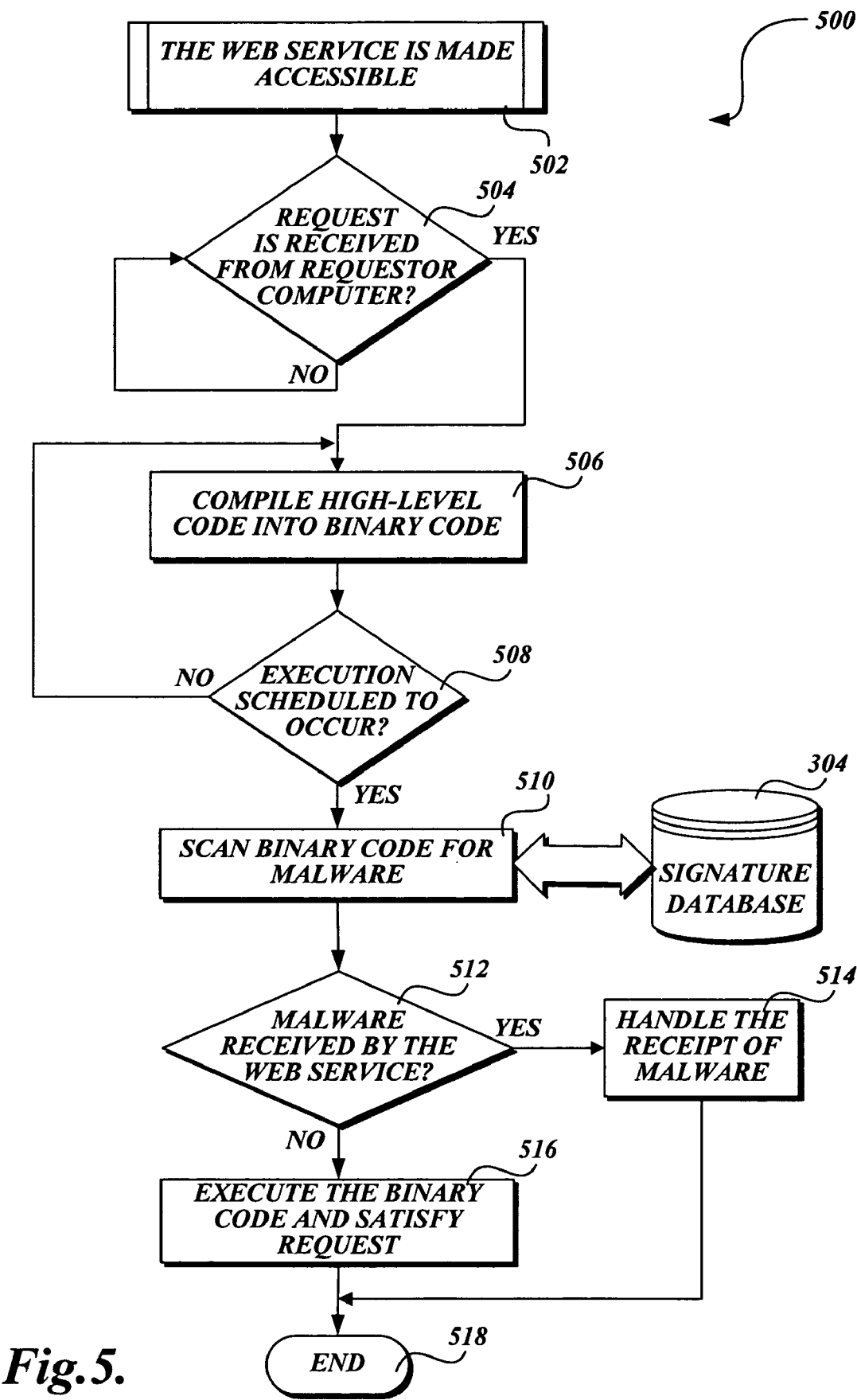
FIG. 5 is a flow diagram illustrating one exemplary embodiment of a software implemented method for identifying malware in a request made to a Web service, in accordance with the present invention.

As illustrated in FIG. 5, the scan method 500 begins at block 502 when a Web service is made accessible. Those skilled in the art and others will recognize that a Web service is an event-driven system in which actions are performed in response to events, such as a Web service request. Thus, to protect a computer that provides a Web service from malware, the scan method 500 is capable of scanning code associated with a request whenever the computer that provides the Web service is capable of accepting a request. Stated differently, aspects of the present invention may be implemented as a system service that protects a computer whenever the computer is configured to accept a request to a Web service.

At decision block 504, the scan method 500 remains idle until a Web request is received at a computer that implements the present invention. As mentioned previously, Web requests may be generated using a number of different software systems and communication protocols. Those skilled in the art will recognize that a Web service typically provides a service description or interface which defines the methods for communicating with the Web service including the manner in which the Web service may be accessed. A software system on a requester computer typically identifies the Web service using a Uniform Resource Indicator ("URI") and makes one or more function calls to the interface defined by the Web service. In some systems, data for making the function call is transmitted over a Web-based protocol, such as HTTP or HTTPS. However, those skilled in the art and others will recognize that the data may be transmitted using other network protocols without departing from the scope of the present invention. Moreover, when transmitted, the request is in a high-level markup language that facilitates the interchange of data between software systems, such as XML. However, those skilled in the art and others will recognize that other markup languages may be used to make Web requests and the example provided herein should be construed as exemplary and not limiting.

As illustrated in FIG. 5, the high-level code that will be executed to satisfy the Web request received at block 504 is compiled into binary code, at block 506. As mentioned previously, in a computer that provides a Web service, binary code may be generated at various times and in different contexts. For example, the on-demand compilation system 204 described above with reference to FIG. 2 compiles high-level code into binary code when the binary code needs to be executed. Then, the binary code is cached or stored in memory for reuse when subsequent Web requests are received. However, since compiling high-level code into binary code may be performed using existing software systems and methods generally known in the art, further description of this aspect of the method 500 will not be described in further detail here.

At decision block 508, the scan method 500 determines whether the binary code generated at block 506 is scheduled to be executed. Since high-level code may be compiled into binary code at various times and in different contexts, the scan method 500 waits until notice that program execution is scheduled to occur before performing a scan for malware. For example, the on-demand compilation system 204 (FIG. 2) may compile a plurality of binary DLLs before program execution is scheduled to occur. In accordance with one embodiment of the present invention, when binary code associated with a request is scheduled to be executed, the on-demand compilation system 204 notifies antivirus software that implements the present invention. In this instance, when binary code associated with a request is scheduled to be executed, the method 500 proceeds to block 510 described in further detail below. If the binary code associated with a request has not been scheduled for execution, the scan method 500 proceeds back to block 506, and blocks 506 through 508 repeat until all of the binary code associated with a request is available and scheduled to be executed.

As illustrated in FIG. 5, at block 510, the method 500 scans the binary code that is scheduled to be executed for malware. As mentioned previously, software-implemented routines in the scan engine 302 (FIG. 3) may be used to scan binary code for malware. In one embodiment of the present invention, the scan performed at block 510 includes matching patterns of code to a malware "signature." For example, signatures maintained in the signature database 304 may be compared to the binary code that is generated as a result of the request received at block 504. However, the scan performed a block 510 may include additional malware identification techniques, such as heuristic malware detection techniques described in more detail below.

Many existing tools allow developers to perform analysis of binary code that is difficult or impossible on code that is in a high level-language. For example, an analysis of binary code may be performed that identifies the function calls made by the binary code to the API of an operating system. Moreover, in some operating systems, individual APIs are each assigned a permission level that is indicative of the privileges required to execute the API. Requests made to a Web service will not typically require calls to an operating system that requires system or administrative privileges. More generally, Web service requests are expected to access a limited "sandbox" of resources. Conversely, API calls to an operating system that requires an elevated privileged level are "suspicious" and may be characteristic of malware. Thus, the scan performed at block 510 may include identifying these types of heuristic factors that are "suspicious." In this regard, existing tools that perform analysis of binary code are used to detect characteristics of the binary code.

It should be well understood that the binary code scanned for malware may originate from different sources. For example, as mentioned previously, a malware author may pass a request to a Web service that causes a denial of service attack. In this instance, software routines on a Web service provider computer accept and interact with the data provided in the request. However, the request is constructed in a way that causes code implemented on the Web service provider computer to consume excessive computer resources. Stated differently, otherwise benign code implemented by the Web service provider computer is manipulated to implement the functionality of malware.

Alternatively, malware may be directly obtained from a remote computer in a request to a Web service. For example, some Web services accept code in the Extensible Stylesheet Language ("XSL") that defines how data in the XML format will be displayed. Moreover, since XSL separates formatting from data, it is commonly used to transform XML into other markup languages, such as HTML. In any event, when high-level code from a language like XSL is accepted by a Web service, the high-level code is compiled into binary code and eventually executed. In this instance, the malware originates entirely from a remote computer that made a request to the Web service. Since the present invention scans binary code, malware may be detected regardless of where the malware originated.

As illustrated in FIG. 5, at decision block 512, the method 500 determines whether malware was identified at block 510. If malware was identified, the method 500 proceeds to block 514, where the receipt of malware at a computer that provides a Web service is handled. Those skilled in the art and others will recognize that the receipt of malware at a Web service may be handled in a number of different ways. For example, the identity of the computer that generated the malware request may be identified and added to a "blacklist" of known malware authors. In this instance, the computer where the request originated may be denied access to the Web service in the future. However, the receipt and identification of malware may be handled using other methods that are generally known in the art. Then, the method 500 proceeds to block 518 where it terminates. If malware was not identified at block 510, the scan method 500 proceeds to block 516 where the binary code required to satisfy the Web request received at block 504 is executed. Since systems for executing binary code generated as a result of a Web request are generally known in the art, further descriptions of these systems will not be provided here.

Implementations of the present invention are not limited to the exemplary method 500 shown in FIG. 5. Other methods may include additional actions or eliminate some actions shown. Also, other methods may perform actions in a different order than illustrated in FIG. 5. For example, the exemplary method 500 shown in FIG. 5 is described in the context of system where high-level code is compiled into binary code by an on-demand compilation system. Once the binary code is scheduled to be executed, a scan of the binary code by the method 500 is performed. However, as mentioned previously with reference to FIG. 4, the present invention may be implemented as a filter where a data stream directed to a Web service is intercepted. In this instance, high-level code is compiled and scanned for malware before being received by the Web service. Thus, the method 500 depicted in FIG. 5 and described in the accompanying text is one embodiment of the present invention and other embodiments are possible.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a networking environment that includes a requestor computer and a computer that provides a web service, a method of protecting the computer that provides the web service from malware generated by the requestor computer, the method comprising:
    (a) receiving a request at the computer that provides the web service, the request including a request to temporarily transfer an execution of a program from the requestor computer to the computer that provides the web service;
    (b) scanning a high-level code in the request for malware; and
    (c) if malware is identified in the high-level code, preventing the request from being compiled into machine executable code by the computer that provides the web service.

2. The method as recited in claim 1, further comprising:
    (a) causing high-level code associated with the request to be compiled into machine executable code that may be executed;
    (b) scanning the machine executable code for malware before the binary code is executed; and
    (c) if malware is identified in the binary code, preventing the machine executable code from being executed.

3. The method as recited in claim 2, further comprising, if malware is not identified in the machine executable code allowing the machine executable code to be executed.

4. The method as recited in claim 2, wherein high-level code associated with the request is compiled into machine executable code by a demand compilation system that is configured to compile the machine executable code immediately prior to execution.

5. The method as recited in claim 4, wherein the on-demand compilation system is configured to notify antivirus software when the machine executable code is scheduled to be executed.

6. The method as recited in claim 2, wherein scanning the machine executable code for malware includes generating a signature of the machine executable code using a hash function and comparing the signature to signatures generated from known malware.

7. The method as recited in claim 2, wherein scanning the machine executable code for malware includes identifying heuristic factors in the machine executable code that are characteristic of malware.

8. The method as recited in claim 7, wherein a heuristic factor identified is the type of calls made by the machine executable code to the operating system installed on the computer that provides the web service.

9. The method as recited in claim 2, wherein the request is compiled into machine executable code in a filter on the web service computer that determines whether the request is malware prior to being processed by software routines that implement the web service.

10. The method as recited in claim 9, wherein the filter is an Internet Server Application Program Interface filter that includes:
  (a) a compiler that causes high-level code associated with the request to be compiled into the machine executable code; and
  (b) antivirus software that scans the machine executable code for malware before the machine executable code is executed.

11. The method as recited in claim 2, wherein the high-level code associated with the request that is compiled into machine executable code is in the Extensible Style Sheet programming language.

12. The method as recited in claim 1, wherein the request is transmitted between the requestor computer and the computer that provides the web service using the Hypertext Transfer Protocol.

13. The method as recited in claim 1, wherein the request is formatted to comply with the Extensible Markup Language protocol.

14. A software system that prevents malware from being executed on a computer that provides a web service, the software system comprising:
  (a) an interface that accepts a web service request, the request including a request to temporarily transfer an execution of a program from a requestor computer to the computer that provides the web service;
  (b) an on-demand compilation system that compiles high-level code associated with the request into machine executable code;
  (c) an execution environment operative to execute machine executable code compiled by the on-demand compilation system; and
  (d) antivirus software for identifying malware in the machine executable code.

15. The software system as recited in claim 14, wherein the antivirus software is configured to identify a malware signature in high-level XML code that is designed to use an amount of computer resources exceeding a threshold.

16. The software system as recited in claim 14, wherein the antivirus software includes a signature database that stores signatures of known malware for access by a scan engine.

17. The software system as recited in claim 14, wherein the on-demand compilation system compiles high-level code into machine executable code only when the functionality of the machine executable code is needed; and
  wherein the on-demand compilation system is further configured to notify the antivirus software when the machine executable code is scheduled to be executed.

18. A computer-readable medium bearing computer-executable instructions that, when executed on a computer that provides a web service, causes the computer to:
  (a) accept a request in the Extensible Markup Language format that is transmitted from a remote computer using the Hypertext Transfer Protocol, the request including a request to temporarily transfer an execution of a program from the remote computer to the computer that provides the web service;
  (b) cause high-level code associated with the request to be scanned for high level constructs that are associated with malware;
  (c) compile the high-level code into machine executable code; and
  (d) cause the machine executable code to be scanned for malware.

19. The computer-readable medium as recited in claim 18, wherein the computer-readable medium is further operative to cause the computer to:
  (a) if malware is identified, prevent the machine executable code from being executed; and
  (b) conversely, if malware is not identified, allow the machine executable code to be executed.

20. The computer-readable medium as recited in claim 18, wherein performing the scan of machine executable code for malware includes identifying heuristic factors in the machine executable code that are characteristic of malware.

* * * * *